Patented July 22, 1941

2,250,424

UNITED STATES PATENT OFFICE 2,250,424

1-METHYL-PROPYL CROTYL BARBITURIC ACID AND ITS SALTS

Horace A. Shonle and Wilbur J. Doran, Indianapolis, Ind., assignors to Eli Lilly and Company, Indianapolis, Ind., a corporation of Indiana No Drawing. Original application July 30, 1938, Serial No. 222,148. Divided and this application May 19, 1941, Serial No. 394,169

3 Claims. (Cl. 260—257)

It is the object of our present invention to produce a new 5,5-disubstituted barbituric acid, and its salts, in which one substituent is the crotyl group (1) 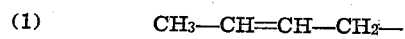

and the other substituent is the 1-methyl-propyl or sec-butyl group.

This present application is a division of our copending application Serial No. 222,148, filed July 30, 1938.

This new 1-methyl-propyl crotyl barbituric acid, and its salts which are included in this present application, all have hypnotic action. They are all represented by the following formula:

(2) 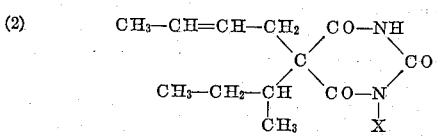

in which X represents a member of the class consisting of hydrogen (if the compound is an acid), and (if the compound is a salt) an alkali metal, such as sodium, an equivalent of an alkaline-earth metal, such as calcium, ammonium, mono-alkyl ammonium, such as —NH$_3$CH$_3$, di-alkyl ammonium, such as

—NH$_2$(C$_2$H$_5$)$_2$, and alkanol ammonium, such as

—NH$_3$CH$_2$CH$_2$OH

This new 1-methyl-propyl crotyl barbituric acid may be prepared in various ways, of which the following two are illustrative:

A. It may be made from the corresponding 1-methyl-propyl crotyl malonic ester, usually an ethyl ester, which is represented by the following formula:

(3) 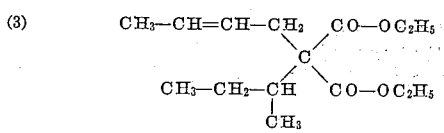

B. It may be made by introducing the crotyl group into a mono-1-methyl-propyl barbituric acid.

In either of these methods, a cyanacetic ester may be used instead of the malonic ester; in which case the resulting imino-barbituric acid is converted by acid hydrolysis into the corresponding barbituric acid.

We will discuss these two methods in order.

Method A

In Method A, we first make the disubstituted 1-methyl-propyl crotyl malonic ester, and then the disubstituted 1-methyl-propyl crotyl barbituric acid.

In making the 1-methyl-propyl crotyl malonic ester, we condense a crotyl halide, such as the bromide or chloride, with the known 1-methyl-propyl malonic ester, or the 1-methyl-propyl halide with crotyl malonic ester, in the presence of sodium ethylate, in the manner customary for making disubstituted malonic esters.

More specifically: 1 mol of sodium is dissolved in from 10 to 12 times its weight of absolute alcohol, under a reflux condenser. 1 mol of 1-methyl-propyl malonic ester (1-methyl-propyl ethylmalonate) is then added. Part of the alcohol that was used may then be removed, as by vacuum distillation, and then about 1.1 mols of crotyl bromide (or crotyl chloride) is gradually added. The crotyl bromide (or crotyl chloride) used is desirably fairly freshly prepared, and relatively free from isomers. (See Winstein and Young, Jour. Am. Chem. Soc., vol. 58, p. 104, 1936.) The mixture is refluxed for some hours, until it no longer shows an alkaline reaction to moist litmus paper. Most of the alcohol remaining, whether or not some had previously been removed, is now removed by vacuum distillation, leaving an oily residue. Water is added to this residue to dissolve out the sodium bromide (or chloride) present in it; and the oily layer, which contains the desired 1-methyl-propyl crotyl malonic ester, is separated and dried. This crude 1-methyl-propyl crotyl malonic ester is fractionally distilled in vacuo, to obtain the desired 1-methyl-propyl crotyl malonic ester. It is a colorless or pale yellow liquid, and is represented by the following formula:

(4) 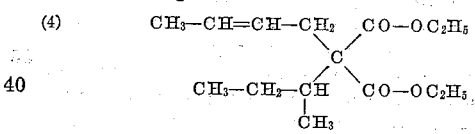

The disubstituted 1-methyl-propyl crotyl barbituric acid corresponding to this 1-methyl-propyl crotyl malonic ester may be prepared in the following manner:

3 mols of sodium are dissolved in 10 to 12 times its weight of absolute alcohol under a reflux condenser. To this are added about 1.6 mols of urea and 1 mol of 1-methyl-propyl crotyl malonic ester. The mixture is gently refluxed for from 12 to 15 hours, after which most of the alcohol is removed by vacuum distillation. The residue is dissolved in water, and a sufficient amount of dilute acid, such as hydrochloric acid, is added to completely throw out of solution the disubstituted 1-methyl-propyl crotyl barbituric acid which has been formed. This is separated, as by filtration; is then dried, and may be washed with gasoline; and is then purified by recrystallization, as from dilute alcohol.

This 1-methyl-propyl crotyl barbituric acid is a white crystalline solid which after the recrystallization from dilute alcohol has a melting point of 130–131° C., corrected; and is represented by the following formula:

(5) 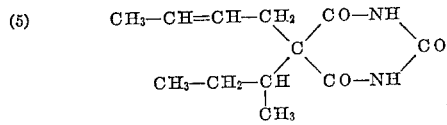

It is insoluble in water, and readily soluble in alcohol and ether; is bitter-tasting; and has hypnotic action.

Method B

In Method B, the crotyl group is introduced into the mono-1-methyl-propyl barbituric acid. The general method of doing this is as follows:

1 mol of the mono-1-methyl-propyl barbituric acid (which is known) is dissolved in a 10% to 35% aqueous solution of 1 mol of potassium hydroxide or sodium hydroxide. To this are added somewhat in excess of 1 mol of a crotyl halide, such as crotyl bromide, and alcohol in suitable amount, preferably sufficient to make a homogeneous solution. There is also preferably added a suitable catalyst, such as a copper salt. The reaction may be caused to go to completion either by agitating the mixture for from 50 to 75 hours at room temperature, or slightly above, or by refluxing it for a briefer period. Then the solution, which may still exhibit two layers if the alcohol concentration is low, is freed from alcohol and from any unreacted crotyl halide, as by vacuum distillation. On cooling, the 1-methyl-propyl crotyl barbituric acid separates; is dried; is washed with petroleum ether; and is dissolved in a minimum amount of a suitable organic solvent, conveniently benzene. The solution thus obtained is preferably washed with a dilute solution of sodium bicarbonate to remove any unreacted mono-1-methyl-propyl barbituric acid. The new 1-methyl-propyl crotyl barbituric acid is extracted from the benzene (or other organic solvent) solution with a dilute sodium-hydroxide solution. Acidification of this extract with dilute acid, conveniently hydrochloric acid, causes the 1-methyl-propyl crotyl barbituric acid to precipitate in a solid or semisolid form which crystallizes on standing. This crude 1-methyl-propyl crotyl barbituric acid is separated from the water, and purified by recrystallization, as from dilute alcohol.

From the 1-methyl-propyl crotyl barbituric acid, obtained by either Method A or Method B, barbiturates may readily be obtained which are represented by Formula 2 above with X representing an alkali metal, an equivalent of an alkaline-earth metal, ammonium, mono-alkyl ammonium, di-alkyl ammonium, or alkanol ammonium. These barbiturates may be obtained by the reaction of the 1-methyl-propyl crotyl barbituric acid, in any suitable solvent, with either the hydroxide or the ethylate of the desired inorganic base, or with ammonia, or with the desired alkyl or alkanol amine. The sodium salt, for instance, is represented by the following formula:

(6) 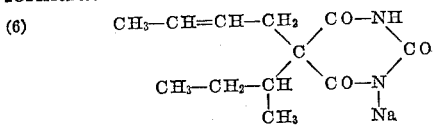

The other alkali-metal salts have the same general formula, save for the substitution of the other metal for sodium.

Specifically, these salts may be prepared as follows: A solution of 1 mol of the hydroxide or ethylate of the alkali metal, such as sodium, is added to a suspension or solution in a suitable solvent, such as alcohol, of 1 mol of the 1-methyl-propyl crotyl barbituric acid; which produces the desired 1-methyl-propyl crotyl barbiturate in solution. The amount of solvent used is desirably sufficient to dissolve the salts produced. The solution is evaporated, preferably under vacuum at low temperature, and desirably after filtration, until the barbiturate is obtained in solid form.

The sodium salt is a white solid, soluble in water and alcohol, and insoluble in ether. It is bitter tasting, and its aqueous solution is alkaline in reaction. It is an excellent hypnotic, when administered either orally or hypodermically.

When these salts are desired in stable form sufficiently free from contaminants so that clear water solutions thereof suitable for intravenous injection may be obtained, they may be so obtained by the method set forth in the Shonle Patent No. 1,856,792, granted May 3, 1932.

If the ammonium or alkyl-amine or alkanolamine salt is desired, it is obtained as follows:

1 mol of the 1-methyl-propyl crotyl barbituric acid is dissolved in or added to somewhat more than 1 mol of an aqueous or alcoholic solution of concentrated ammonia, or of an alkyl amine, such for instance as mono- or di-methyl amine or mono- or di-ethyl amine, or of an alkanol amine, such for instance as ethanol amine or propanol amine. The resulting barbiturate crystallizes out, or is concentrated to solid form. The formulas of these barbiturates correspond in general to the formula of the acid, save that NH4 or the proper substituted-ammonium radical is substituted for H at the point X of Formula 2.

We claim as our invention:

1. A 1-methyl-propyl crotyl barbituric compound which is represented by the following formula:

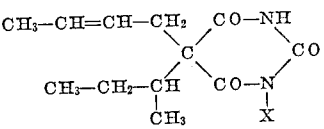

in which X represents a member of the class consisting of hydrogen, an alkali metal, an equivalent of an alkaline-earth metal, ammonium, mono-alkyl ammonium, di-alkyl ammonium, and alkanol ammonium.

2. 1-Methyl-propyl crotyl barbituric acid, which is represented by the following formula:

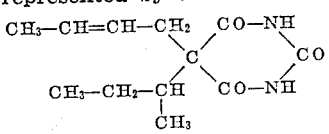

3. Sodium 1-methyl-propyl crotyl barbiturate, which is represented by the following formula:

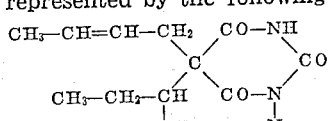

HORACE A. SHONLE.
WILBUR J. DORAN.